Oct. 26, 1926.  
M. W. POWELL  
CAR WHEEL  
Filed June 18, 1924  
1,604,852  
2 Sheets-Sheet 1
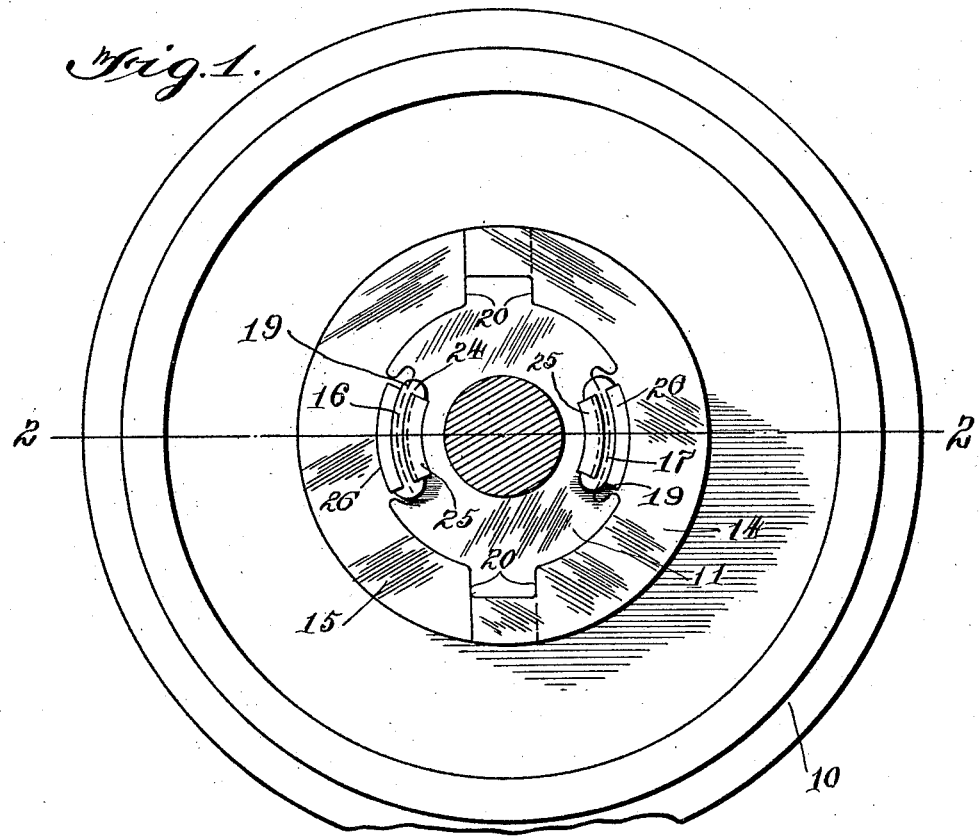
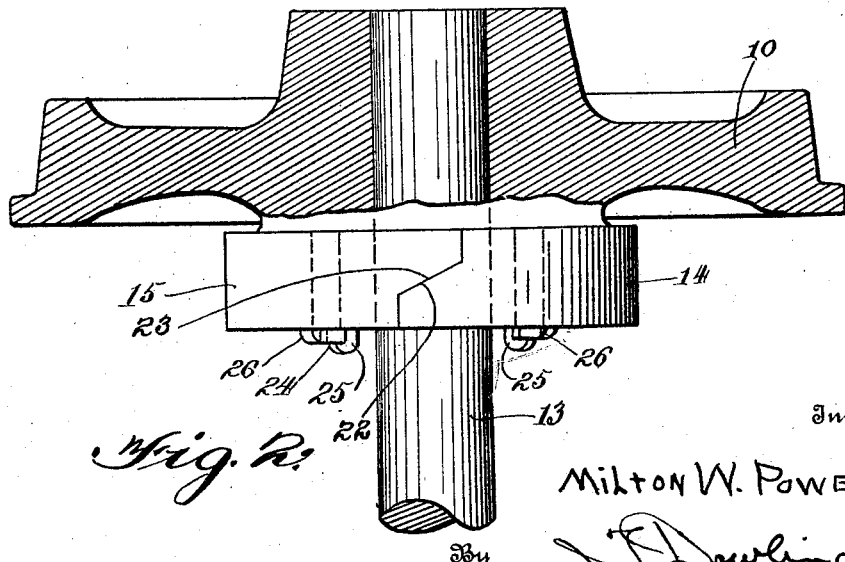
Inventor  
Milton W. Powell  
By J. F. Dowling  
Attorney Oct. 26, 1926.

M. W. POWELL 1,604,852

CAR WHEEL

Filed June 18, 1924   2 Sheets-Sheet 2

Inventor

Milton W. Powell

By J. D. Dowling
Attorney

Patented Oct. 26, 1926.

1,604,852

UNITED STATES PATENT OFFICE.

MILTON W. POWELL, OF BALTIMORE, MARYLAND.

CAR WHEEL.

Application filed June 18, 1924. Serial No. 720,750.

The invention relates to railway car wheels, and has as an object the provision of a brake drum upon a car wheel. An object of the invention is the provision of a brake drum having removable brake surfaces which can be renewed when worn.

An illustrative embodiment of the invention is shown in the accompanying drawing, in which—

Fig. 1 is an elevation from the inside of the car wheel with the axle in section.

Fig. 2 is a horizontal section on line 2—2 of Fig. 1, with the brake drum shown in plan.

Fig. 3 is an exploded perspective view of the car wheel and the brake surfaces.

Figure 5:
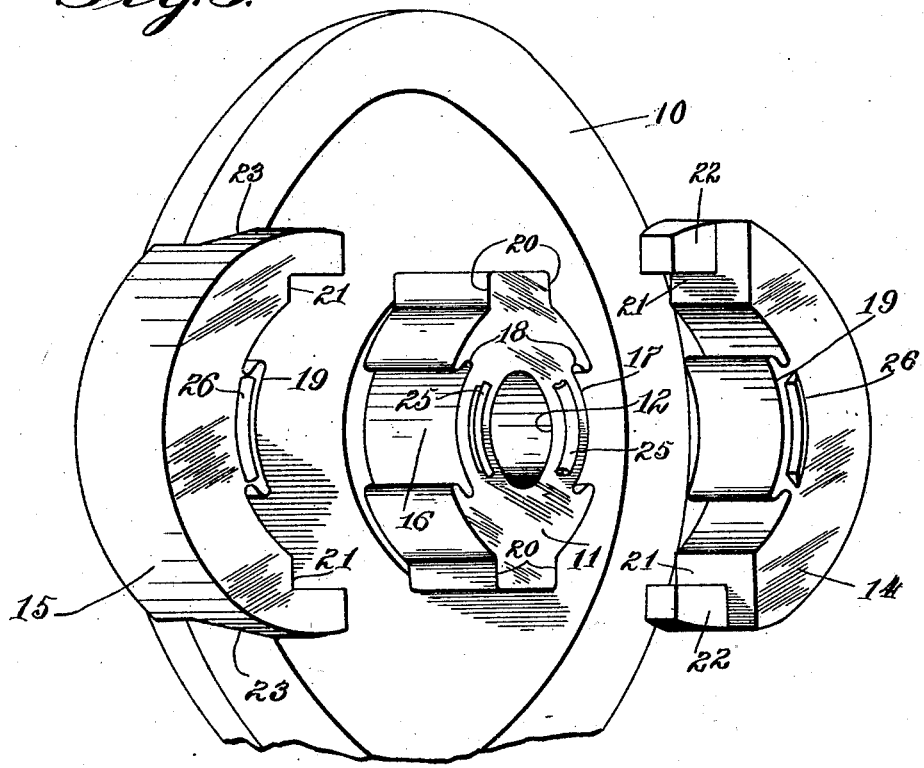

A car wheel of the usual form is shown at 10. The usual practice of applying the brakes by pressing shoes against the tread of the car wheel causes the car wheels to wear away very rapidly. There is very little wear by action of the wheel upon the rail so long as the wheel is not locked and caused to slide on the rail, in which event the flat spot on the wheel often results, since wear is caused by slippage between the wearing surfaces. The slippage between the brake shoe and the tread of the wheel causes the rapid wear of the wheel and also of the brake shoes.

According to the present invention a drum 11 is provided upon the inner surface of the wheel, being preferably cast integral therewith, and having the opening 12 for the axle 13 provided therein. If desired the drum 11 may be made readily separable from the car wheel 11, and could be renewed by removing the entire drum. However since car wheels are usually secured to the axles in such a manner as to be removed only with great difficulty, considerable difficulty would be entailed by removal of the entire drum if the same were to be slipped off from the axle.

It is therefore preferred to provide a renewable surface for the drum, which surface can be readily removed and new parts substituted. A convenient form of parts for such renewal is that shown in the drawings, wherein surface elements 14—15 are provided, which when placed together about the drum form a complete cylinder thereabout. To secure the elements 14—15 to the drum in a readily removable manner the drum is shown as cast with recesses 16—17, having undercut portions 18 at each end. The elements 14—15 are provided with projections 19 adapted to fit within the recesses, the projections 19 forming in effect a dovetail, with the surface thereof upon the arc of a circle to adapt itself to the stationary portion of the hub 11.

The entire braking action upon the wheel may be transmitted from the surface 15 to the stationary portion of the hub 11. To increase the resistance to the turning moment of elements 14—15 upon the hub 11, shoulders 20 are preferably formed upon diametrically opposite portions of the hub 11, and recesses 21 of a corresponding form are provided in the elements 14—15.

As brake shoes which may be applied to the drum surfaces slide about the drum a joint parallel axis of the wheel would tend to become uneven and to cause undue resistance to slippage of the brake shoe. A diagonal joint between the elements 14—15 will tend to prevent such undue resistance and to provide such a joint through at least a portion of its extent the surfaces 22 are provided upon the element 15 and complementary surfaces 23 upon the element.

In the form shown in Fig. 3 the element 14 will be applied to the drum independently, and element 15 will be afterwards applied, the surfaces 23 then fitting down over the surfaces 22. After such an assembly a key 24 may be slipped between overhanging projections 25—26 carried by the drum and the elements respectively, which will prevent movement of the elements laterally away from the car wheel.

Figure 4:
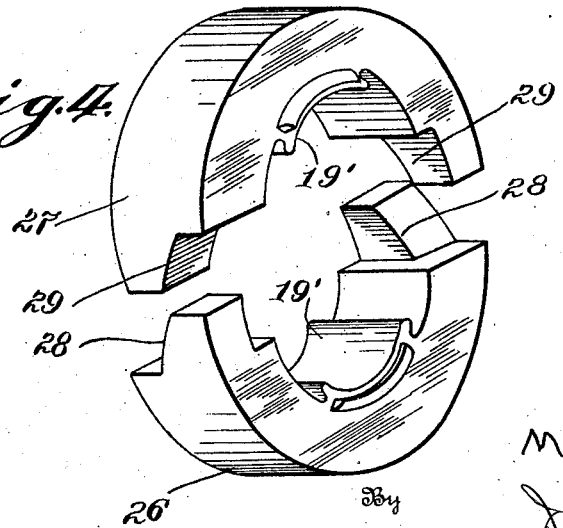
Fig. 4 is a perspective view of a modified form.

The form of the device shown in Figs. 1 to 3 inclusive requires elements 14—14, which are unlike and must therefore be cast in different molds. A form of element as shown in Fig. 4 in which the two elements are alike can therefore be used on either side of the drum. In this form of the device the two elements 26—27 have the diagonal surfaces 28—29 overlapping each other as in the first form described by slipping in opposite directions on the two sides of the drum. In this form of the device the elements must be placed together about the axle laterally, and in their assembled positions the projections 19' must be slipped into the recess 16 upon the drum 11, after which a key 24 can be placed as in the form first described.

Minor changes may be made in the physical embodiment of the invention without departing from its spirit.

I claim as my invention:

1. A brake drum for railway cars comprising, in combination, a drum member rigidly secured to the wheel about the axle thereof, and having recesses in its surface, shoulders formed upon said member, surface elements having projections and having recesses adapted to seat against said shoulders to prevent circumferential movement relative to said member.

2. A brake drum for railway cars comprising, in combination, a drum member rigidly secured to the wheel about the axle thereof, and having recesses in its surface, shoulders formed upon said member, surface elements having recesses adapted to seat against said shoulders to prevent circumferential movement relative to said member, projections upon said elements, the projection upon each element being complemental to the projection upon the adjoining element, the contacting surface between projections being in a plane at an angle other than a right angle to the axis of the wheel.

3. A brake drum for railway cars comprising, in combination, a drum member secured to the inner surface of the wheel about the axis thereof, projections upon said member presenting shoulders on their opposite sides, readily removable complemental surface elements having recesses to fit against said shoulders and projections to extend upon said first named projections to meet the projection on the adjoining element, the meeting projections together providing the full width of the drum surface, the contacting surface between said projections being in a plane at an angle other than a right angle to the axis of the wheel.

In testimony whereof he hereunto affixes his signature.

MILTON W. POWELL.